United States Patent
Nakama

(10) Patent No.: US 11,428,676 B2
(45) Date of Patent: Aug. 30, 2022

(54) THERMAL CONDUCTIVITY DETECTOR AND GAS CHROMATOGRAPH INCLUDING SAME

(71) Applicant: Shimadzu Corporation, Kyoto (JP)

(72) Inventor: Yuji Nakama, Kyoto (JP)

(73) Assignee: Shimadzu Corporation, Kyoto (JP)

(*) Notice: Subject to any disclaimer, the term of this patent is extended or adjusted under 35 U.S.C. 154(b) by 366 days.

(21) Appl. No.: 16/543,781

(22) Filed: Aug. 19, 2019

(65) Prior Publication Data

US 2020/0088696 A1 Mar. 19, 2020

(30) Foreign Application Priority Data

Sep. 13, 2018 (JP) .............................. JP2018-171859

(51) Int. Cl.
*G01N 30/66* (2006.01)
*G01N 30/12* (2006.01)
*G01N 30/02* (2006.01)

(52) U.S. Cl.
CPC ............ *G01N 30/66* (2013.01); *G01N 30/12* (2013.01); *G01N 2030/025* (2013.01)

(58) Field of Classification Search
CPC ... G01N 30/66; G01N 30/12; G01N 2030/025
See application file for complete search history.

(56) References Cited

U.S. PATENT DOCUMENTS

| 5,034,193 A * | 7/1991 | Maroulis ............... G01N 30/84 422/89 |
| 6,550,961 B1 * | 4/2003 | Ueda ..................... G01N 27/18 374/44 |
| 7,185,527 B2 | 3/2007 | Lin |
| 2007/0144238 A1 | 6/2007 | Mahoney et al. |

FOREIGN PATENT DOCUMENTS

| CN | 102141488 A | 8/2011 |
| CN | 203616294 U | 5/2014 |
| JP | 07-43356 A | 2/1995 |

(Continued)

OTHER PUBLICATIONS

Combined Chinese Office Action and Search Report dated Oct. 26, 2021 in Chinese Patent Application No. 201910863960.3 (with unedited computer generated English translation), 13 pages.

(Continued)

*Primary Examiner* — Randy W Gibson
*Assistant Examiner* — John M Royston
(74) *Attorney, Agent, or Firm* — Oblon, McClelland, Maier & Neustadt, L.L.P.

(57) ABSTRACT

An upstream portion of a flow path is stored in a cell block. A filament for detecting thermal conductivity of a sample gas is stored in the upstream portion. The sample gas is led to a downstream portion of an exhaust pipe path through the flow path. The flow path is kept warm by a temperature retainer such that the temperature of the sample gas that passes through the exhaust pipe path does not decrease to a temperature equal to or lower than a liquefaction temperature of the sample gas. Alternatively, at least one portion including a downstream end of the exhaust pipe path is provided to be attachable to and detachable from another portion of the flow path.

20 Claims, 7 Drawing Sheets

(56) References Cited

FOREIGN PATENT DOCUMENTS

JP            2007-3190 A      1/2007
JP            2016142688 A   *   8/2016

OTHER PUBLICATIONS

Office Action dated Jan. 11, 2022 in corresponding Japanese Patent Application No. 2018-171859 (with English Translation), 8 pages.
Office Action dated May 26, 2022 in corresponding Chinese Patent Application No. 201910863960.3 (with English-language Translation), 8 pages.

* cited by examiner

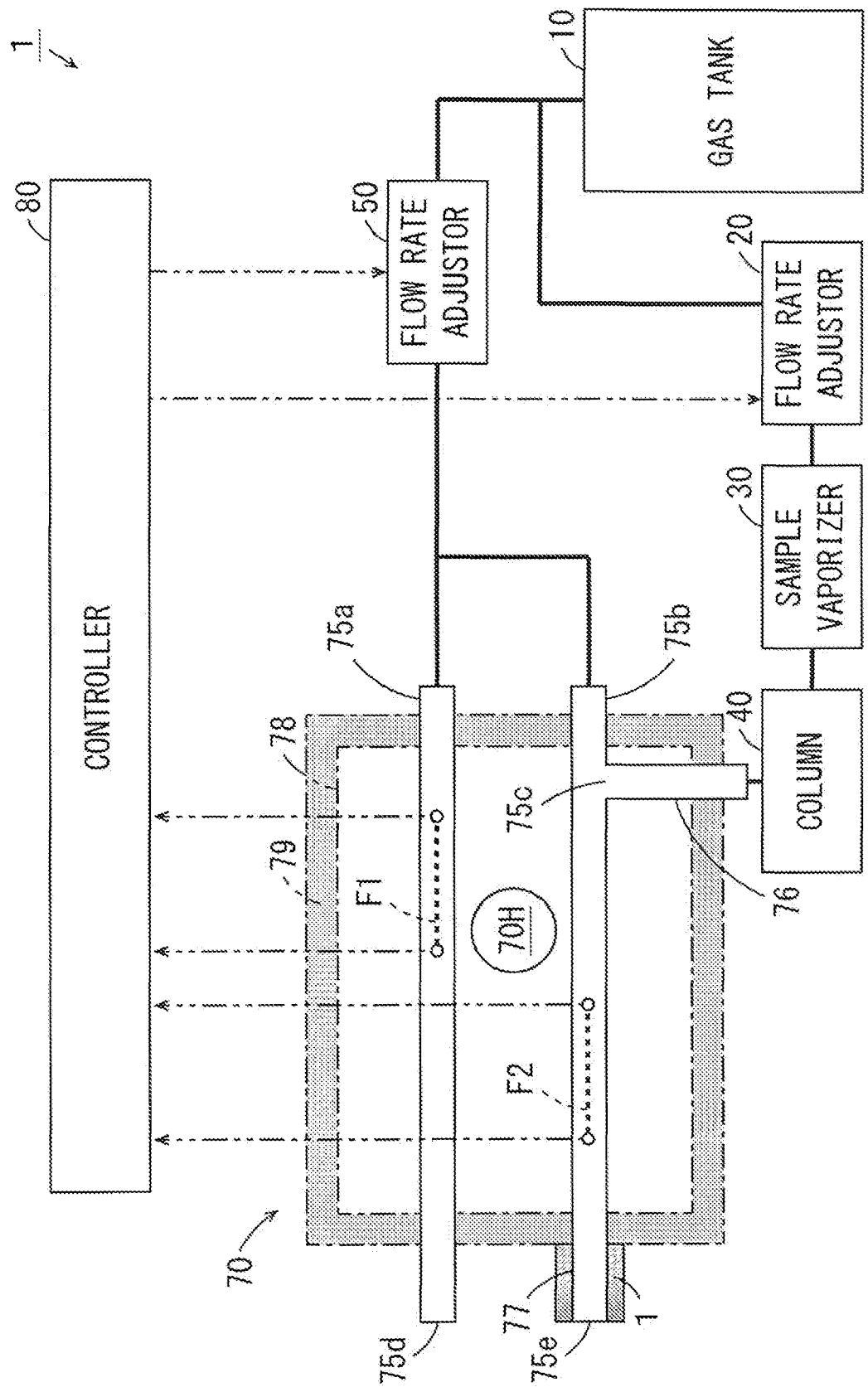
F I G. 4

THERMAL CONDUCTIVITY DETECTOR AND GAS CHROMATOGRAPH INCLUDING SAME

BACKGROUND OF THE INVENTION

Field of the Invention

The present invention relates to a thermal conductivity detector for a gas chromatograph and the gas chromatograph including the thermal conductivity detector.

Description of Related Art

In a gas chromatograph, a thermal conductivity detector is used to analyze a sample, for example. The thermal conductivity detector described in U.S. Pat. No. 7,185,527 B2 includes one cavity in which a filament is arranged. With the filament heated to a certain temperature, a sample gas and a reference gas are led into the cavity alternately.

At this time, the filament loses heat due to the thermal conduction of the led gas, and a resistance value of the filament changes. As such, the difference between the resistance value of the filament in the case where the sample gas flows through the cavity and the resistance value of the filament in the case where the reference gas flows through the cavity is measured, whereby the thermal conductivity of the sample gas is measured. The sample gas and the reference gas that have passed through the cavity are exhausted to the outside of the thermal conductivity detector through a pipe connected to the cavity.

BRIEF SUMMARY OF THE INVENTION

As described above, the pipe (hereinafter referred to as an exhaust pipe) through which the sample gas that has been led into the flow path in which the filament is arranged to the outside of the thermal conductivity detector is provided in the thermal conductivity detector.

In the gas chromatograph, when the flow path of the thermal conductivity detector becomes clogged, it is necessary to replace the thermal conductivity detector with a new thermal conductivity detector. However, thermal conductivity detectors are costly. Therefore, it is difficult to reduce the running cost of the gas chromatograph.

An object of the present invention is to provide a thermal conductivity detector that can reduce running cost of a gas chromatograph and the gas chromatograph including the thermal conductivity detector.

As described above, it has been conventionally known that the flow path of a thermal conductivity detector becomes clogged in the gas chromatograph. However, this clogging in the flow path has been identified as a phenomenon that indicates the time for replacing the thermal conductivity detector, and the configuration for preventing the flow path from becoming clogged has not been considered.

The inventor of the present invention carried out various experiments and studies repeatedly in order to specify the cause of clogging in the flow path. As a result, the inventor of the present invention paid attention to the fact that clogging in the flow path repeatedly occurs in its downstream portion. The downstream portion of the flow path is located outside of a casing of the thermal conductivity detector and exposed to air having a temperature lower than the temperature of the sample gas. Therefore, it is considered that the exhaust pipe becomes clogged since the vaporized sample gas having a high temperature is cooled in the exhaust pipe, and condensed or coagulated.

As such, the inventor of the present invention changed the way of thinking from the conventional technique of replacing the thermal conductivity detector because of clogging in the exhaust pipe, considered to utilize the thermal conductivity detector continuously by preventing the clogging in the flow path as well as the problem and devised the following invention.

(1) A thermal conductivity detector according to one aspect of the present invention for a gas chromatograph includes a flow path that has a first portion, and a second portion located at a position farther downstream than the first portion, and leads a sample gas to an exhaust port of the second portion through the first and second portions, a casing that stores the first portion, a heat generator that is stored in the first portion to detect thermal conductivity of the sample gas, and a temperature retainer that keeps the flow path warm such that a temperature of the sample gas that passes through the second portion does not decrease to a temperature equal to or lower than a liquefaction temperature of the sample gas.

In this thermal conductivity detector, the first portion of the flow path is stored in the casing. Therefore, the second portion located at a position farther downstream than the first portion of the flow path is located outside of the casing. The heat generator for detecting the thermal conductivity of the sample gas is stored in the first portion. The sample gas is led to the exhaust port of the second portion through the first and second portions of the flow path. The flow path is kept warm by the temperature retainer such that the temperature of the sample gas that passes through the second portion does not decrease to a temperature equal to or lower than the liquefaction temperature of the sample gas.

This configuration prevents the sample gas having a high temperature from being cooled in the downstream portion of the flow path, and being condensed or coagulated. Therefore, the flow path is prevented from becoming clogged, and it is not necessary to replace the thermal conductivity detector in the gas chromatograph. As a result, the running cost of the gas chromatograph can be reduced.

(2) The temperature retainer may include a first temperature retainer attached to the casing, and a second temperature retainer attached to the second portion. In this case, the entire flow path is kept warm. Thus, the flow path can be more easily prevented from becoming clogged.

(3) The temperature retainer may be attached to the casing such that the temperature of the sample gas that passes through the second portion does not decrease to a temperature equal to or lower than the liquefaction temperature of the sample gas. In this case, the flow path can be prevented from becoming clogged without attachment of the temperature retainer to the second portion.

(4) A length of the second portion that is located outside of the casing may be set such that a temperature of the sample gas to be exhausted from the second portion does not decrease to a temperature equal to or lower than the liquefaction temperature. In this case, the flow path can be more easily prevented from becoming clogged without attachment of the second portion to the temperature retainer.

(5) The temperature retainer may include a thermal insulator that insulates the sample gas from outside of the casing. In this case, the flow path can be easily kept warm such that the temperature of the sample gas that passes through the second portion does not decrease to a temperature equal to or lower than the liquefaction temperature of the sample gas.

(6) The temperature retainer may include a temperature adjustor that adjusts the temperature of the sample gas. In this case, the flow path can be easily kept warm such that the temperature of the sample gas that passes through the second portion does not decrease to a temperature equal to or lower than the liquefaction temperature of the sample gas.

Next, the inventor of the present invention paid attention to the fact that clogging in the flow path repeatedly occurs in the downstream portion of the flow path and devised the following invention.

(7) A thermal conductivity detector according to another aspect of the present invention for a gas chromatograph includes a flow path that has a first portion, and a second portion located at a position farther downstream than the first portion, and leads a sample gas to an exhaust port of the second portion through the first and second portions, a casing that stores the first portion, and a heat generator that is stored in the first portion to detect thermal conductivity of the sample gas, wherein at least one portion including a downstream end of the second portion is provided to be attachable to and detachable from another portion of the flow path.

In this thermal conductivity detector, the first portion of the flow path is stored in the casing. Therefore, the second portion located at a position farther downstream than the first portion of the flow path is located outside of the casing. The heat generator for detecting the thermal conductivity of the sample gas is stored in the first portion. The sample gas is led to the exhaust port of the second portion through the first and second portions of the flow path. At least one portion including the downstream end of the second portion of the flow path is provided to be attachable to and detachable from another portion of the flow path.

With this configuration, even when the downstream portion of the flow path becomes clogged, it is possible to continue to use the thermal conductivity detector by replacing at least one portion including the downstream end of the second portion of the flow path. Therefore, it is not necessary to exchange the entire thermal conductivity detector. Thus, the running cost of the gas chromatograph can be reduced. Further, the downtime of the gas chromatograph can be shortened.

(8) A gas chromatograph according to yet another aspect of the present invention includes a sample vaporizer that produces a sample gas by vaporizing a sample, a column that separates the sample gas produced by the sample vaporizer into components, and the thermal conductivity detector according to one aspect or another aspect, wherein the thermal conductivity detector detects thermal conductivity of each component of the sample gas separated by the column.

In this gas chromatograph, the sample gas is produced by vaporization of the sample by the sample vaporizer. The sample gas produced by the sample vaporizer is separated into components by the column. The thermal conductivity of each component of the sample gas separated by the column is detected by the above-mentioned thermal conductivity detector.

In the thermal conductivity detector, the flow path is prevented from becoming clogged, so that it is not necessary to replace the thermal conductivity detector in the gas chromatograph. Alternatively, even when the downstream portion of the flow path becomes clogged, at least one portion including the downstream end of the second portion of the flow path is replaced. Thus, the thermal conductivity detector can be continuously used. Thus, the running cost of the gas chromatograph can be reduced.

Other features, elements, characteristics, and advantages of the present invention will become more apparent from the following description of preferred embodiments of the present invention with reference to the attached drawings.

BRIEF DESCRIPTION OF THE SEVERAL VIEWS OF THE DRAWING

FIG. 4 is a block diagram showing the configuration of a first modified example of the gas chromatograph;

DESCRIPTION OF THE PREFERRED EMBODIMENTS

A thermal conductivity detector and a gas chromatograph including the thermal conductivity detector according to one embodiment of the present invention will be described below with reference to drawings.

Figure 1:
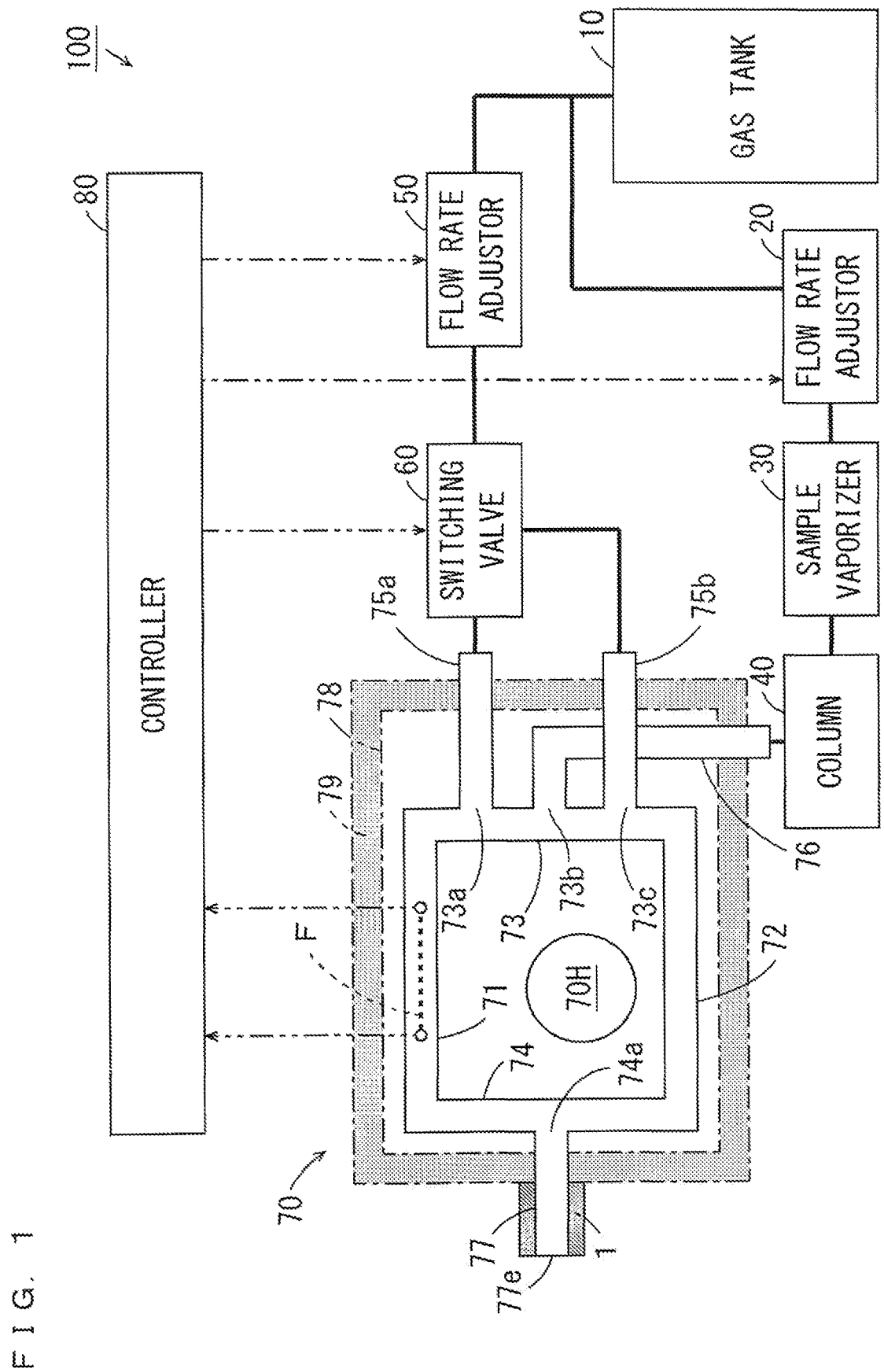
FIG. 1 is a block diagram showing the configuration of a gas chromatograph according to a first embodiment.

[1] First Embodiment (1) Outline of Configuration and Basic Operations of Gas Chromatograph FIG. 1 is a block diagram showing the configuration of the gas chromatograph according to the first embodiment. As shown in FIG. 1, the gas chromatograph 100 according to the present embodiment mainly includes a gas tank 10, a flow rate adjustor 20, a sample vaporizer 30, a column 40, a flow rate adjustor 50, a switching valve 60, a thermal conductivity detector 70 and a controller 80.

A carrier gas for leading a sample gas, described below, to the column 40 and the thermal conductivity detector 70 is stored in the gas tank 10. As the carrier gas, an inert gas such as a helium gas is used.

The gas tank 10 supplies the carrier gas to the two flow rate adjustors 20, 50 through a branch pipe path. The one flow rate adjustor 20 supplies a predetermined flow rate of the carrier gas to the sample vaporizer 30 based on the control of the controller 80.

The sample vaporizer 30 includes an injector and a vaporization chamber. A sample is injected into the vaporization chamber of the sample vaporizer 30 through the injector. The atmosphere inside of the vaporization chamber is maintained in a state such that the sample is vaporized. Thus, the sample injected into the vaporization chamber is vaporized inside of the vaporization chamber. The sample vaporizer 30 supplies the vaporized sample to the column 40 while mixing the vaporized sample with the carrier gas supplied from the flow rate adjustor 20. In the following description, the gas including a component of the sample vaporized in the sample vaporizer 30 is collectively termed as a sample gas.

The column 40 is stored in a column oven (not shown). In the column 40, the sample gas supplied from the sample vaporizer 30 is separated into respective components. The column 40 supplies the sample gas separated into components to a sample lead-in pipe path 76, described below, of the thermal conductivity detector 70.

The other flow rate adjustor 50 supplies a predetermined flow rate of the carrier gas to the switching valve 60 based on the control of the controller 80. The switching valve 60 is a three-way electromagnetic valve, for example, and is connected to the flow rate adjustor 50 and two carrier lead-in pipe paths 75a, 75b, described below, of the thermal conductivity detector 70. The flow rate adjustor 50 supplies the carrier gas supplied from the gas tank 10 to either one of the carrier lead-in pipe paths 75a, 75b based on the control of the controller 80.

As the configuration for supplying the carrier gas that passes through the flow rate adjustor 50 to either one of the two carrier lead-in pipe paths 75a, 75b, a switching mechanism including a plurality of control valves and a branch pipe path may be used instead of the switching valve 60. For example, a main pipe path is connected to the flow rate adjustor 50, and two sub-pipe paths are respectively connected to the carrier lead-in pipe paths 75a, 75b. Further, two control valves are respectively provided at the two sub-pipe paths. In this case, it is possible to supply the carrier gas supplied from the flow rate adjustor 50 selectively to either one of the two carrier lead-in pipe paths 75a, 75b of the thermal conductivity detector 70 by controlling open and close states of the two control valves.

The thermal conductivity detector 70 according to the present embodiment includes a first pipe path 71, a second pipe path 72, a third pipe path 73 and a fourth pipe path 74 that extend respectively linearly, and the carrier lead-in pipe paths 75a, 75b, the sample lead-in pipe path 76 and an exhaust pipe path 77. The first pipe path 71, the second pipe path 72, the third pipe path 73 and the fourth pipe path 74, the carrier lead-in pipe paths 75a, 75b, the sample lead-in pipe path 76 and the exhaust pipe path 77 are examples of a flow path. The first pipe path 71 and the exhaust pipe path 77 are examples of first and second portions of the flow path, respectively.

The plurality of these pipe paths are formed of metallic pipes, for example. Further, the first to fourth pipe paths 71 to 74 out of the plurality of pipe paths of the thermal conductivity detector 70 are stored in a cell block 78 together with a heating device 70H. The cell block 78 is an example of a casing. A plurality of metallic plate-shape members are processed and joined to one another, so that the cell block 78 is fabricated.

The first pipe path 71 and the second pipe path 72 are formed to extend to be opposite to each other and in parallel to each other. The third pipe path 73 is formed to connect one end of the first pipe path 71 to one end of the second pipe path 72, and the fourth pipe path 74 is formed to connect the other end of the first pipe path 71 to the other end of the second pipe path 72. A filament F is stored inside of the first pipe path 71. On the other hand, the filament F is not stored inside of the second pipe path 72. The filament F is an example of a heat generator.

In the third pipe path 73, a first gas lead-in portion 73a, a second gas lead-in portion 73b and a third gas lead-in portion 73c are provided to be arranged in this order. Out of the first to third gas lead-in portions 73a to 73c, the first gas lead-in portion 73a is the closest to the first pipe path 71, and the third gas lead-in portion 73c is the closest to the second pipe path 72.

The carrier lead-in pipe path 75a is formed to extend from the first gas lead-in portion 73a to the outside of the cell block 78. The sample lead-in pipe path 76 is formed to extend from the second gas lead-in portion 73b to the outside of the cell block 78. The carrier lead-in pipe path 75b is formed to extend from the third gas lead-in portion 73c to the outside of the cell block 78.

A gas lead-out portion 74a is provided in the fourth pipe path 74. The exhaust pipe path 77 is formed to extend from the gas lead-out portion 74a to the outside of the cell block 78. A through hole is formed in the gas lead-out portion 74a. Thus, the inner space of the fourth pipe path 74 communicates with the inner space of the exhaust pipe path 77. The exhaust pipe path 77 has an exhaust port 77e outside of the cell block 78.

The heating device 70H is controlled by the controller 80 and keeps the space in the cell block 78 at the temperature substantially equal to the temperature in the vaporization chamber of the sample vaporizer 30 or the temperature in the column oven storing the column 40. As the heating device 70H, a cartridge heater is used, for example. The cell block 78 is surrounded by a thermal insulator 79. The thermal insulator 79 may be glass wool, for example, or may be another member.

The controller 80 is constituted by a CPU (Central Processing Unit) and a memory, or a microcomputer, for example, and controls operations of each of the constituent elements of the gas chromatograph 100 as described above. Further, the controller 80 of the present example further includes a driving circuit for driving the filament F and a detection circuit for detecting a change in resistance of the filament F.

The above-mentioned switching valve 60 is switched between a first state and a second state in a predetermined period (about 100 msec, for example), the first state being the state where the carrier gas is supplied to the one carrier lead-in pipe path 75a, and the second state being the state where the carrier gas is supplied to the other carrier lead-in pipe path 75b.

In this case, when the switching valve 60 is in the first state, the pressure in the space closer to the first gas lead-in portion 73a is higher than the pressure in the space closer to the second gas lead-in portion 73b in the third pipe path 73 of the thermal conductivity detector 70. Thus, the sample gas supplied to the sample lead-in pipe path 76 flows through the second pipe path 72 together with part of the carrier gas that is led from the first gas lead-in portion 73a. Further, the rest of the carrier gas that is led from the first gas lead-in portion 73a flows through the first pipe path 71 as a reference gas.

On the other hand, when the switching valve 60 is in the second state, the pressure in the space closer to the third gas lead-in portion 73c is higher than the pressure in the space closer to the second gas lead-in portion 73b in the third pipe path 73 of the thermal conductivity detector 70. Thus, the sample gas supplied to the sample lead-in pipe path 76 flows through the first pipe path 71 together with part of the carrier gas that is led from the third gas lead-in portion 73c. Further, the rest of the carrier gas led from the third gas lead-in portion 73c flows through the second pipe path 72.

Thus, in the controller 80, the thermal conductivity of the sample gas is measured based on a difference between the resistance value of the filament F in the case where the reference gas passes around the filament F and the resistance value of the filament F in the case where the sample gas passes around the filament F.

(2) Temperature Retainer

As described above, in the thermal conductivity detector 70, the space in the cell block 78 is kept at the temperature subsequently equal to the evaporation temperature of the sample by the heating device 70H. In contrast, a large part of the exhaust pipe path 77 that is drawn from the inside to the outside of the cell block 78 is exposed to air having a room temperature (about 25° C., for example). Therefore, the sample gas that passes through the exhaust pipe path 77 is cooled at the downstream end of the exhaust pipe path 77, and condensed or coagulated. Thus, when analysis of the sample gas is carried out a multiple times, the condensed or coagulated sample is accumulated at the downstream end of the exhaust pipe path 77, and the exhaust pipe path 77 becomes clogged. When the liquefaction temperature of the sample is high or when the concentration of the sample is high, this problem becomes more noticeable.

As such, in the present embodiment, a thermal insulator 1 is attached to the portion of the exhaust pipe path 77 drawn out from the cell block 78 as the temperature retainer for preventing the temperature of the sample gas to be exhausted from decreasing to a temperature equal to or lower than the liquefaction temperature. The thermal insulator 1 may be formed of the same member as the thermal insulator 79, or may be formed of another member. In the configuration of FIG. 1, the temperature retainer is constituted by the thermal insulators 1, 79, and the thermal insulator 79 and the thermal insulator 1 are examples of first and second temperature retainers, respectively.

Figure 2A:
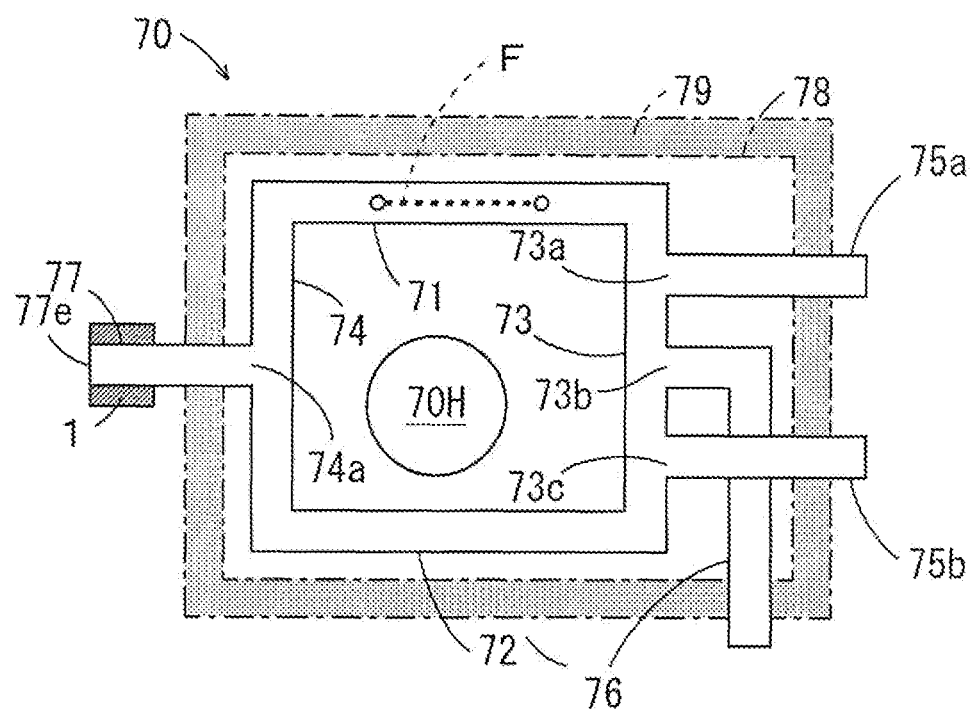
FIGS. 2A and 2B are schematic diagrams showing first modified examples of a thermal conductivity detector.
Figure 2B:
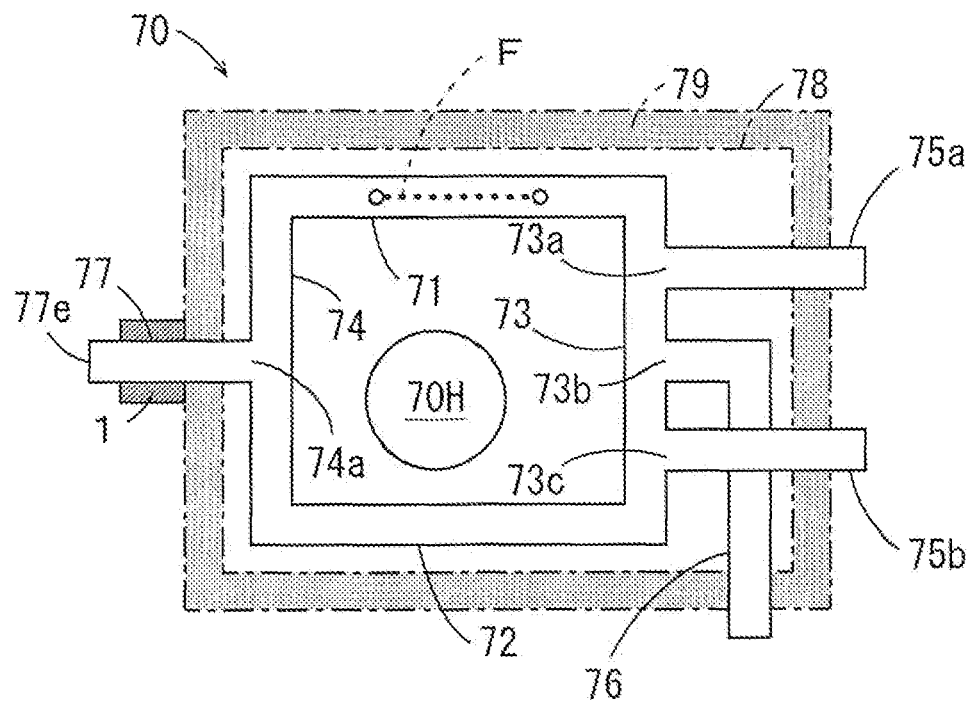

While the thermal insulator 1 is attached to cover the entire outer peripheral surface of the exhaust pipe path 77 drawn out from the cell block 78 in the example of FIG. 1, the present invention is not limited to this. FIGS. 2A and 2B are schematic diagrams showing first modified examples of the thermal conductivity detector 70. As shown in FIG. 2A, the thermal insulator 1 may be attached to cover the outer peripheral surface of the downstream portion of the exhaust pipe path 77. Alternatively, as shown in FIG. 2B, the thermal insulator 1 may be attached to cover the outer peripheral surface except for the downstream portion of the exhaust pipe path 77.

In this manner, the thermal insulator 1 may be attached to cover only part of the outer peripheral surface of the exhaust pipe path 77 drawn out from the cell block 78. Further, in the case where the thermal insulator 79 attached to the cell block 78 operates as a temperature retainer, and the projection length of the exhaust pipe path 77 from the cell block 78 is set short such that the temperature of the sample gas exhausted from the exhaust pipe path 77 does not decrease to a temperature equal to or lower than the liquefaction temperature, the thermal conductivity detector 70 does not have to include the thermal insulator 1.

Figure 3:
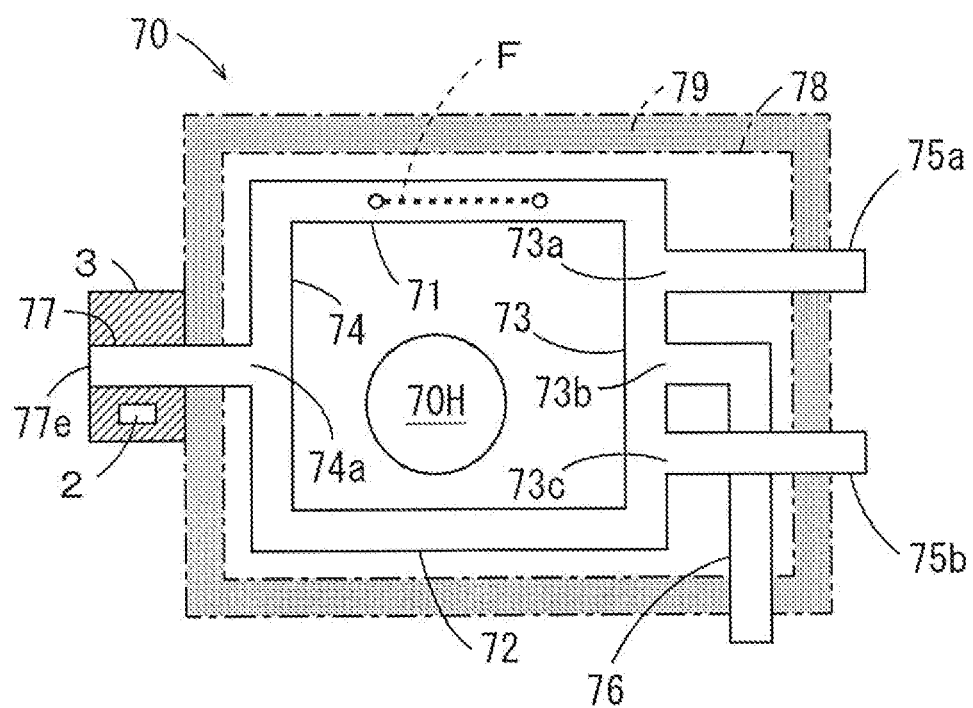
FIG. 3 is a schematic diagram showing a second modified example of the thermal conductivity detector.

While the temperature retainer is the thermal insulator 1 or the thermal insulator 79 in the examples of FIGS. 1 and 2, the present invention is not limited to this. FIG. 3 is a schematic diagram showing a second modified example of the thermal conductivity detector 70. As shown in FIG. 3, the thermal conductivity detector 70 includes a temperature adjustor 2 instead of the thermal insulator 1.

While the temperature adjustor 2 is an electric heater, for example, the temperature adjustor 2 may be another member such as a peltier element or a heating medium. The temperature adjustor 2 is attached to the exhaust pipe path 77 by a block-shape attachment member 3, and generates heat such that the temperature of the sample gas to be exhausted from the exhaust pipe path 77 does not decrease to a temperature equal to or lower than the liquefaction temperature. An amount of heat generated by the temperature adjustor 2 may be controlled by the controller 80 of FIG. 1.

The attachment member 3 is formed of a member having high thermal conductivity such as aluminum or copper, for example, holds the temperature adjustor 2 and transmits the heat generated by the temperature adjustor 2 to the exhaust pipe path 77. The attachment member 3 may cover the entire outer peripheral surface of the exhaust pipe path 77 drawn out from the cell block 78, or may cover only part of the outer peripheral surface of the exhaust pipe path 77. Further, in the case where the temperature adjustor 2 is directly attachable to the exhaust pipe path 77, the thermal conductivity detector 70 does not have to include the attachment member 3. In the configuration of FIG. 3, the temperature retainer is constituted by the thermal insulator 79 and the temperature adjustor 2, and the thermal insulator 79 and the temperature adjustor 2 are first and second temperature retainers, respectively.

Further, instead of the thermal insulator 79, a temperature adjustor similar to the temperature adjustor 2 may be attached to the cell block 78. Here, in the case where the temperature adjustor attached to the cell block 78 operates as a temperature retainer, and the projection length of the exhaust pipe path 77 from the cell block 78 is set short such that the temperature of the sample gas exhausted from the exhaust pipe path 77 does not decrease to a temperature equal to or lower than the liquefaction temperature, the temperature adjustor 2 does not have to be attached to the exhaust pipe path 77.

(3) First Modified Example of Gas Chromatograph

FIG. 4 is a block diagram showing the configuration of the first modified example of the gas chromatograph 100. As for a gas chromatograph 100 according to the first modified example, differences from the gas chromatograph 100 of FIG. 1 will be described.

As shown in FIG. 4, in the gas chromatograph 100 according to the first modified example, a thermal conductivity detector 70 is basically constituted by two carrier lead-in pipe paths 75a, 75b, a sample lead-in pipe path 76, two filaments F1, F2 and a cell block 78.

The carrier lead-in pipe paths 75a, 75b are provided to penetrate the cell block 78. The both ends of each of the carrier lead-in pipe paths 75a, 75b are drawn out to the outside of the cell block 78. The carrier lead-in pipe path 75a has an exhaust port 75d at one of the both ends. The carrier lead-in pipe path 75b has an exhaust port 75e at one of the both ends.

The filament F1 is stored inside of the cell block 78 and inside of the one carrier lead-in pipe path 75a, and the filament F2 is stored inside of the cell block 78 and inside of the other carrier lead-in pipe path 75b.

A flow rate adjustor 50 is connected to the two carrier lead-in pipe paths 75a, 75b through a branch pipe path. Thus, in the thermal conductivity detector 70, a carrier gas is supplied from the flow rate adjustor 50 to the carrier lead-in pipe paths 75a, 75b.

A gas lead-in portion 75c is provided at a position further upstream than the filament F2 in the carrier lead-in pipe path 75b. The sample lead-in pipe path 76 is formed to extend from the gas lead-in portion 75c to the outside of the cell block 78. A through hole is formed in the gas lead-in portion 75c. Thus, the inner space of the carrier lead-in pipe path 75b communicates with the inner space of the sample lead-in pipe path 76.

In this gas chromatograph 100, with the carrier gas respectively supplied to the carrier lead-in pipe paths 75a, 75b from the flow rate adjustor 50, a sample gas is supplied to the sample lead-in pipe path 76 from a column 40. Thus, in the carrier lead-in pipe path 75a, the carrier gas passes around the filament F1 as a reference gas. On the other hand, in the carrier lead-in pipe path 75b, the sample gas supplied from the sample lead-in pipe path 76 passes around the filament F2 together with the carrier gas.

Thus, in the controller 80, the thermal conductivity of the sample gas is measured based on a resistance value of the filament F1 in the case where the reference gas passes around the filament F1 and a resistance value of the filament F2 in the case where the sample gas passes around the filament F2.

In the present example, the downstream end of the carrier lead-in pipe path 75b drawn out from the cell block 78 is an exhaust pipe path 77. The carrier lead-in pipe path 75b and the sample lead-in pipe path 76 are examples of a flow path. The portion of the carrier lead-in pipe path 75b except for the exhaust pipe path 77 is an example of a first portion of the flow path, and the exhaust pipe path 77 is an example of a second portion of the flow path. The filament F2 is an example of a heat generator.

Also in the present example, the exhaust pipe path 77 is drawn out to the outside of the cell block 78, so that the exhaust pipe path 77 may become clogged due to the sample gas. As such, in the present example, a temperature retainer for preventing the temperature of the sample gas to be exhausted from decreasing to a temperature equal to or lower than the liquefaction temperature is attached to the exhaust pipe path 77. In the configuration of FIG. 4, the temperature retainer is constituted by thermal insulators 1, 79 and the thermal insulator 79 and the thermal insulator 1 are examples of first and second temperature retainers, respectively.

The thermal insulator 1 may be attached to cover only part of the outer peripheral surface of the exhaust pipe path 77 as in the examples of FIGS. 2A and 2B. In the case where the thermal insulator 79 attached to the cell block 78 operates as the temperature retainer, and the exhaust pipe path 77 is formed to be sufficiently short such that the temperature of the sample gas exhausted from the exhaust pipe path 77 does not decrease to a temperature equal to or lower than the liquefaction temperature, the thermal conductivity detector 70 does not have to include the thermal insulator 1. Alternatively, instead of the thermal insulator 1 or instead of the thermal insulators 1, 79, the temperature adjustor 2 of FIG. 3 may be attached to the exhaust pipe path 77 as the temperature retainer. This applies to a second modified example of the gas chromatograph 100, described below.

In the present example, the downstream end of the carrier lead-in pipe path 75a drawn out from the cell block 78 also functions as an exhaust pipe. However, the sample gas is not supplied to the carrier lead-in pipe path 75a, and the carrier lead-in pipe path 75a does not become clogged due to the sample gas. Therefore, the temperature retainer is not attached to the exhaust pipe corresponding to the carrier lead-in pipe path 75a.

(4) Second Modified Example of Gas Chromatograph

Figure 5:
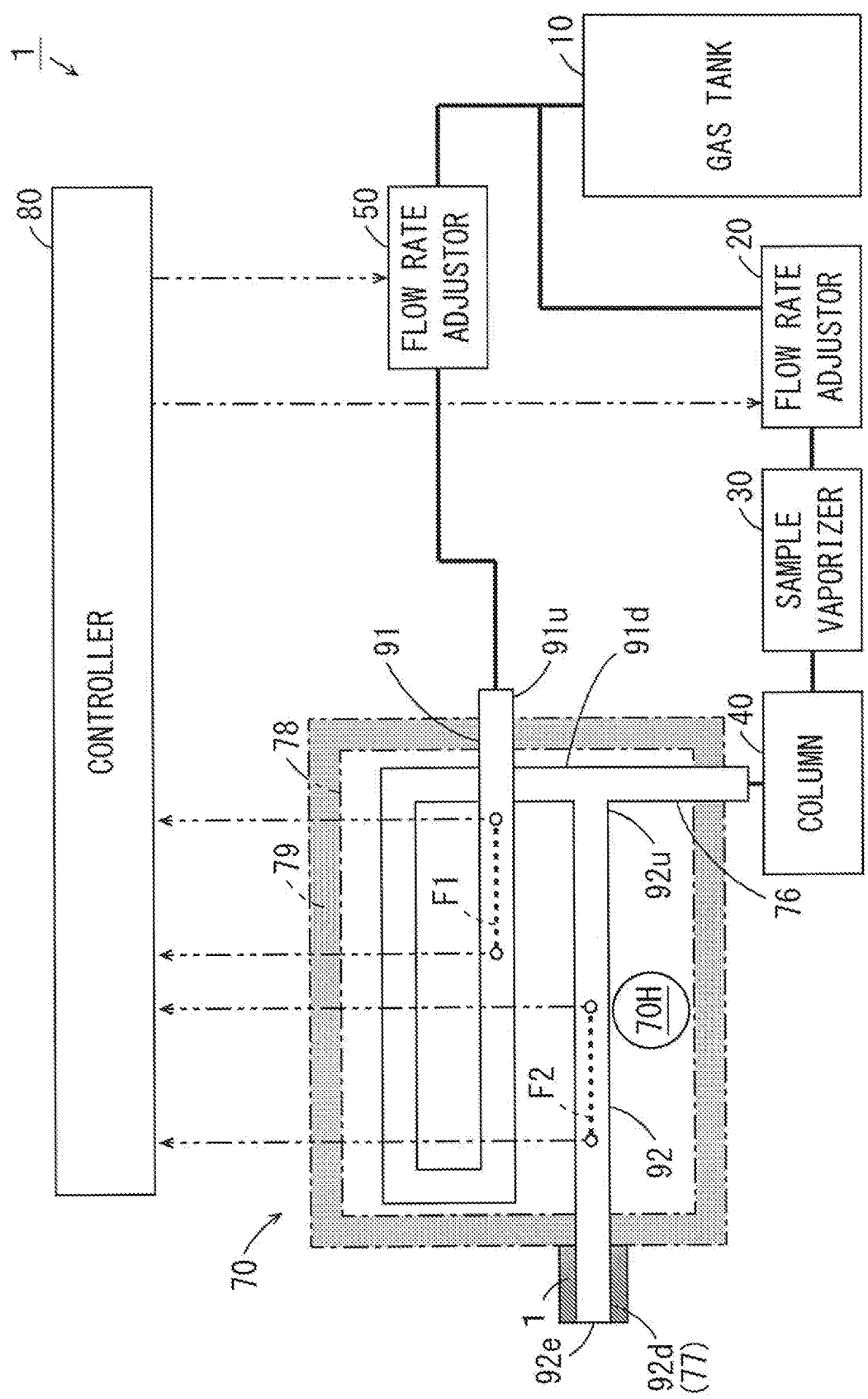
FIG. 5 is a block diagram showing the configuration of a second modified example of the gas chromatograph.

FIG. 5 is a block diagram showing the configuration of the second modified example of the gas chromatograph 100. As for a gas chromatograph 100 according to the second modified example, differences from the gas chromatograph 100 of FIG. 1 will be described.

As shown in FIG. 5, in the gas chromatograph 100 according to the second modified example, a thermal conductivity detector 70 is basically constituted by a sample lead-in pipe path 76, a carrier lead-in pipe path 91, a gas flow pipe 92, two filaments F1, F2 and a cell block 78.

The carrier lead-in pipe path 91 has an upstream end 91u and a downstream end 91d, and the gas flow pipe 92 has an upstream end 92u and a downstream end 92d. The gas flow pipe 92 has an exhaust port 92e at the downstream end 92d.

With the upstream end 91u drawn out to the outside of the cell block 78, the rest of the carrier lead-in pipe path 91 is stored in the cell block 78. Further, with the downstream end 92d drawn out to the outside of the cell block 78, the rest of the gas flow pipe 92 is stored in the cell block 78. The downstream end 91d of the carrier lead-in pipe path 91 is connected to the upstream end 92u of the gas flow pipe 92, and one end of the sample lead-in pipe path 76 is connected to the upstream end 92u of the gas flow pipe 92. The other end of the sample lead-in pipe path 76 is drawn out to the outside of the cell block 78. The filament F1 is stored inside of the carrier lead-in pipe path 91, and the filament F2 is stored inside of the gas flow pipe 92. A carrier gas is supplied from a flow rate adjustor 50 to the upstream end 91u of the carrier lead-in pipe path 91.

In this gas chromatograph 100, with the carrier gas supplied from the flow rate adjustor 50 to the carrier lead-in pipe path 91, the sample gas is supplied from the column 40 to the sample lead-in pipe path 76. Thus, in the carrier lead-in pipe path 91, the carrier gas passes around the filament F1 as a reference gas. On the other hand, in the gas flow pipe 92, the sample gas supplied from the sample lead-in pipe path 76 passes around the filament F2 together with the carrier gas supplied from the carrier lead-in pipe path 91.

Thus, in the controller 80, the thermal conductivity of the sample gas is measured based on a resistance value of the filament F1 in the case where the reference gas passes around the filament F1 and a resistance value of the filament F2 in the case where the sample gas passes around the filament F2.

In the present example, the downstream end 92d of the gas flow pipe 92 drawn out from the cell block 78 is an exhaust pipe path 77. The sample lead-in pipe path 76 and the carrier lead-in pipe path 91 are examples of a flow path. The portion of the carrier lead-in pipe path 91 except for the exhaust pipe path 77 is an example of a first portion of the flow path, and the exhaust pipe path 77 is an example of a second portion of the flow path. The filaments F1, F2 are examples of a heat generator.

Also in the present example, the exhaust pipe path 77 is drawn out to the outside of the cell block 78, so that the exhaust pipe path 77 may become clogged due to the sample gas. As such, in the present example, a temperature retainer for preventing the temperature of the sample gas to be exhausted from decreasing to a temperature equal to or lower than the liquefaction temperature is attached to the exhaust pipe path 77. In the configuration of FIG. 5, the temperature retainer is constituted by thermal insulators 1, 79, and the thermal insulator 79 and the thermal insulator 1 are examples of first and second temperature retainers, respectively.

(5) Effects

In the thermal conductivity detector 70 according to the present embodiment, the upstream portion of the flow path is stored in the cell block 78, and the exhaust pipe path 77 in the downstream portion of the flow path is outside of the cell block 78. The filaments F, F1, F2 for detecting the thermal conductivity of the sample gas are stored in the upstream portion of the flow path. The sample gas is led to the exhaust pipe path 77 through the flow path. The flow path is kept warm by the temperature retainer such as the thermal insulator 1, the temperature adjustor 2 or the thermal insulator 79 such that the temperature of the sample gas that passes through the exhaust pipe path 77 does not decrease to a temperature equal to or lower than the liquefaction temperature of the sample gas.

This configuration prevents the sample gas having a high temperature from being cooled, and condensed or coagulated in the exhaust pipe path 77. Therefore, the flow path is prevented from becoming clogged, and it is not necessary to replace the thermal conductivity detector 70 in the gas chromatograph 100. As a result, the running cost of the gas chromatograph 100 can be reduced.

[2] Second Embodiment (1) Outline of Configuration of Gas Chromatograph

Figure 6:
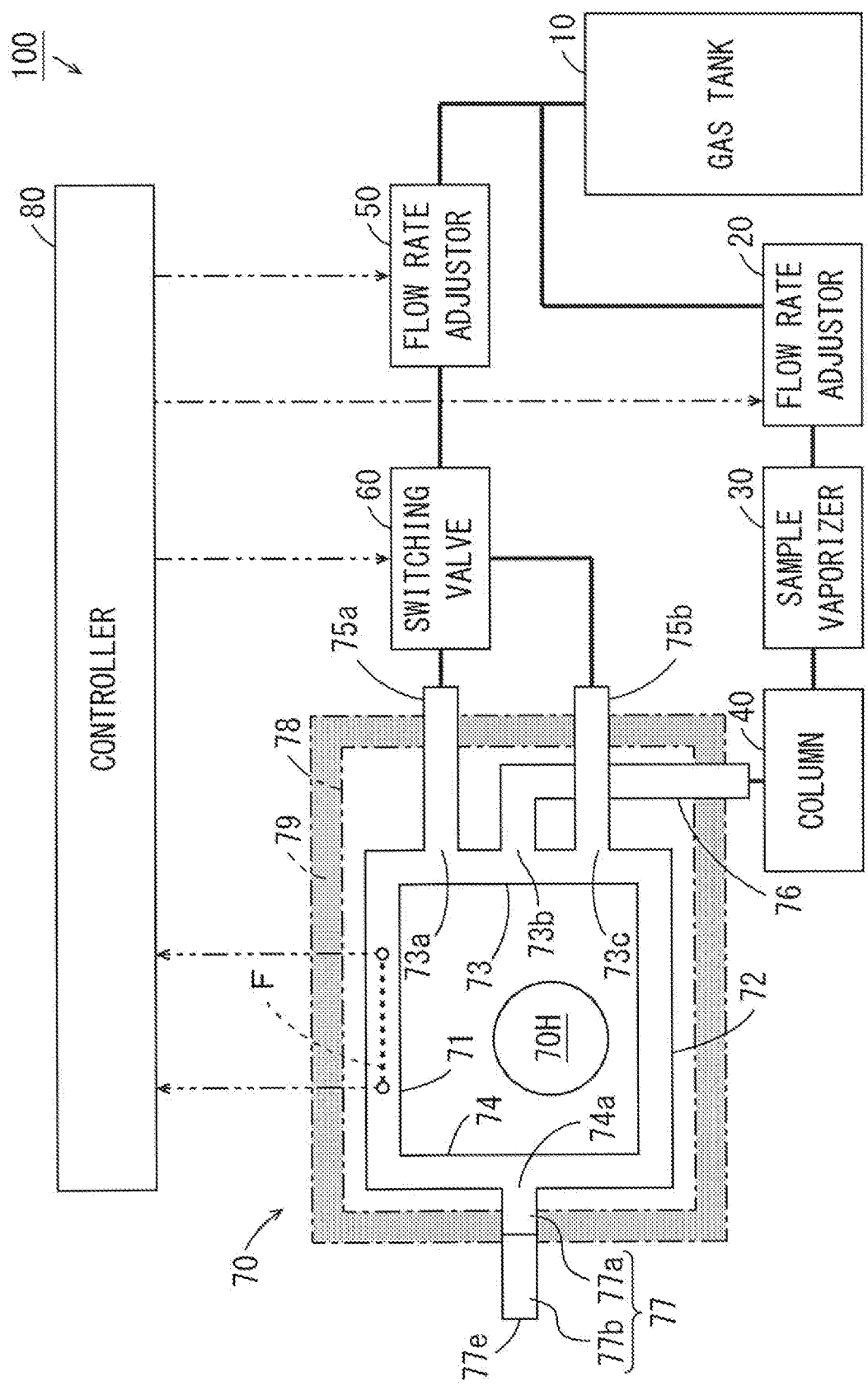
FIG. 6 is a block diagram showing the configuration of a gas chromatograph according to a second embodiment.

As for a gas chromatograph according to a second embodiment, differences from the gas chromatograph 100 according to the first embodiment will be described. FIG. 6 is a block diagram showing the configuration of the gas chromatograph according to the second embodiment. As shown in FIG. 6, a thermal conductivity detector 70 in the present embodiment does not include a thermal insulator 1. Further, an exhaust pipe path 77 of the thermal conductivity detector 70 includes a fixing portion 77a and an attachment-detachment portion 77b.

The gas chromatograph 100 according to the present embodiment may have the configuration similar to that of the gas chromatograph 100 of FIG. 4 or 5 except that the thermal conductivity detector 70 does not include the thermal insulator 1, and the exhaust pipe path 77 includes the fixing portion 77a and the attachment-detachment portion 77b.

One end of the fixing portion 77a is connected to a gas lead-out portion 74a. In the present example, the fixing portion 77a is fixed to the gas lead-out portion 74a and is not attachable or detachable. The other end of the fixing portion 77a is drawn out to the outside of the cell block 78. In the present example, the other end of the fixing portion 77a does not project outwardly from a thermal insulator 79. The attachment-detachment portion 77b is connected to the other end of the fixing portion 77a to be attachable to and detachable from the fixing portion 77a. The sample gas, the thermal conductivity of which is measured in the thermal conductivity detector 70, is exhausted to the outside of the thermal conductivity detector 70 through the fixing portion 77a and the attachment-detachment portion 77b in this order.

(2) Modified Example of Exhaust Pipe

Figure 7:
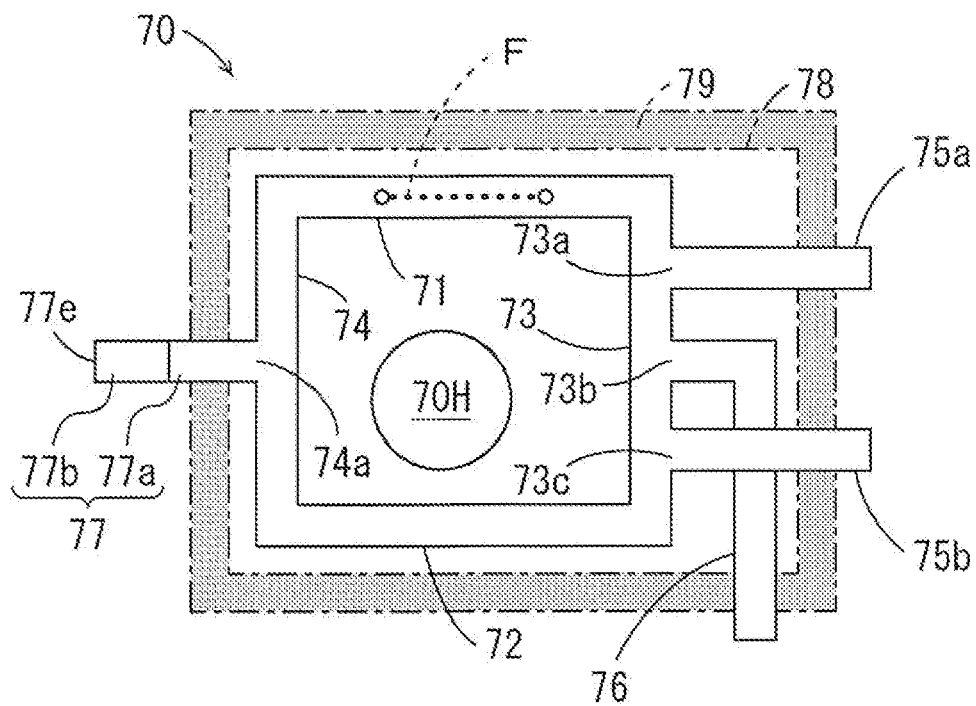
FIG. 7 is a schematic diagram showing a first modified example of an exhaust pipe path.

While the other end of the fixing portion 77a does not project outwardly from the thermal insulator 79 in the example of FIG. 6, the present invention is not limited to this. FIG. 7 is a schematic diagram showing a first modified example of the exhaust pipe path 77. As shown in FIG. 7, the other end of the fixing portion 77a may subtly project outwardly from the thermal insulator 79. Here, the length of the portion of the fixing portion 77a projecting from the thermal insulator 79 is restricted such that the temperature of the sample gas to be exhausted from the fixing portion 77a does not become equal to or lower than the liquefaction temperature. In this case, the sample gas that has passed through the fixing portion 77a is led to the attachment-detachment portion 77b without being liquefied, and is exhausted to the outside of the thermal conductivity detector 70 after passing through the attachment-detachment portion 77b.

Figure 8:
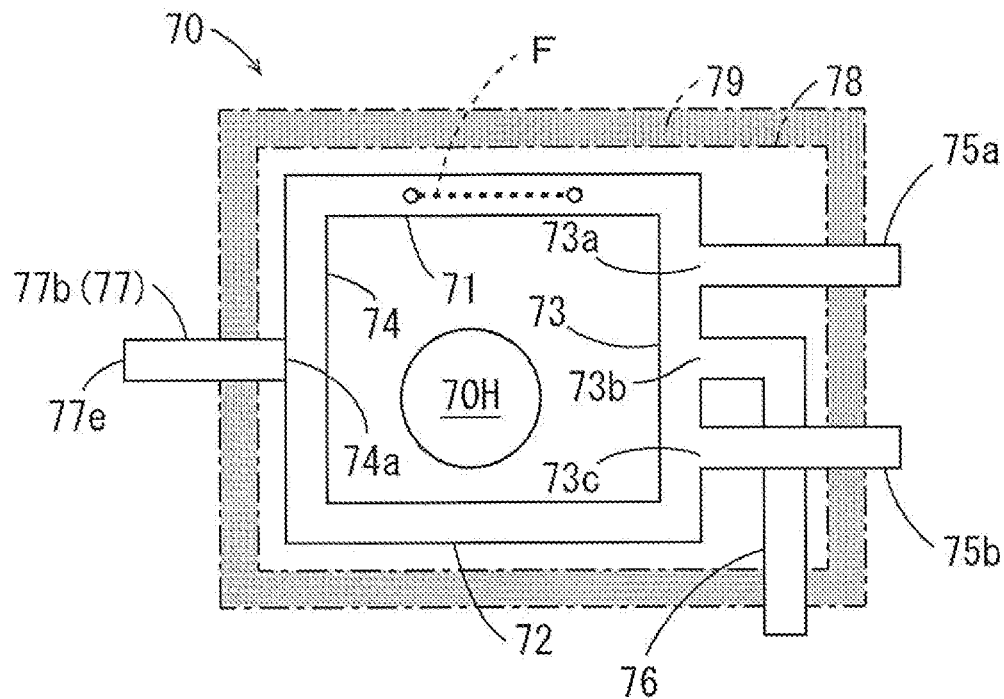
FIG. 8 is a schematic diagram showing a second modified example of the exhaust pipe path.

While the exhaust pipe path 77 includes the fixing portion 77a in the examples of FIGS. 6 and 7, the present invention is not limited to this. FIG. 8 is a schematic diagram showing a second modified example of the exhaust pipe path 77. As shown in FIG. 8, an exhaust pipe path 77 does not include a fixing portion 77a and only includes an attachment-detachment portion 77b. The attachment-detachment portion 77b is detachably and attachably connected to a gas lead-out portion 74a. The sample gas, the thermal conductivity of which has been measured in the thermal conductivity detector 70, is exhausted to the outside of the thermal conductivity detector 70 through the attachment-detachment portion 77b.

(3) Effects

In the thermal conductivity detector 70 according to the present embodiment, the upstream portion of the flow path is stored in the cell block 78 and the exhaust pipe path 77 in the downstream portion of the flow path is located outside of the cell block 78. The filaments F, F1, F2 for detecting the thermal conductivity of the sample gas are stored in the upstream portion of the flow path. The sample gas is led to the exhaust pipe path 77 through the flow path. At least one portion including the downstream end of the exhaust pipe path 77 includes the attachment-detachment portion 77b, and is provided to be attachable to and detachable from the fixing portion 77a or another portion of the flow path such as the fourth pipe path 74.

With this configuration, even when the downstream portion of the exhaust pipe path 77 becomes clogged, it is possible to continuously use the thermal conductivity detector 70 by replacing at least the attachment-detachment portion 77b including the downstream end of the exhaust pipe path 77. Therefore, it is not necessary to replace the entire thermal conductivity detector 70. This reduces the running cost of the gas chromatograph 100. Further, the downtime of the gas chromatograph 100 can be shortened.

While preferred embodiments of the present invention have been described above, it is to be understood that variations and modifications will be apparent to those skilled in the art without departing the scope and spirit of the present invention. The scope of the present invention, therefore, is to be determined solely by the following claims.

I claim:

1. A thermal conductivity detector for a gas chromatograph, comprising:
    a casing;
    a thermal insulator attached to the casing;
    a flow path comprising a first portion stored in the casing and a second portion positioned outside the thermal insulator and farther downstream than the first portion such that the flow path leads a sample gas to an exhaust port of the second portion;
    a heat generator stored in the first portion of the flow path such that the heat generator detects thermal conductivity of the sample gas; and
    a temperature retainer attached to the second portion of the flow path such that the temperature retainer is not attached to the first portion stored in the casing.

2. The thermal conductivity detector according to claim 1, wherein the thermal insulator is attached to the casing such that a temperature of the sample gas that passes through the second portion does not decrease to a temperature equal to or lower than a liquefaction temperature of the sample gas.

3. The thermal conductivity detector according to claim 1, wherein the temperature retainer includes glass wool.

4. The thermal conductivity detector according to claim 1, wherein the temperature retainer includes a thermal insulator insulates the sample gas from outside the casing.

5. The thermal conductivity detector according to claim 1, wherein the temperature retainer includes a temperature adjustor that adjusts the temperature of the sample gas.

6. A gas chromatograph, comprising:
a sample vaporizer that produces a sample gas by vaporizing a sample;
a column that separates the sample gas produced by the sample vaporizer into components; and
the thermal conductivity detector of claim 1,
wherein the thermal conductivity detector detects thermal conductivity of each component of the sample gas separated by the column.

7. The thermal conductivity detector according to claim 2, wherein the temperature retainer includes glass wool.

8. The thermal conductivity detector according to claim 2, wherein the thermal insulator insulates the sample gas from outside the casing.

9. The thermal conductivity detector according to claim 2, wherein the temperature retainer includes a temperature adjustor that adjusts the temperature of the sample gas.

10. A gas chromatograph, comprising:
a sample vaporizer that produces a sample gas by vaporizing a sample;
a column that separates the sample gas produced by the sample vaporizer into components; and
the thermal conductivity detector of claim 2,
wherein the thermal conductivity detector detects thermal conductivity of each component of the sample gas separated by the column.

11. A gas chromatograph, comprising:
a sample vaporizer that produces a sample gas by vaporizing a sample;
a column that separates the sample gas produced by the sample vaporizer into components; and
the thermal conductivity detector of claim 3,
wherein the thermal conductivity detector detects thermal conductivity of each component of the sample gas separated by the column.

12. The thermal conductivity detector according to claim 3, wherein the temperature retainer includes a temperature adjustor that adjusts the temperature of the sample gas.

13. The thermal conductivity detector according to claim 1, further comprising:
a heating device positioned in the casing such that the heating device keeps a space in the casing at a temperature substantially equal to a temperature in a vaporization chamber of a sample vaporizer or a temperature in a column oven,
wherein the temperature retainer formed on the casing and the second portion of the flow path such that a temperature of the sample gas passing through the second portion does not decrease to a temperature equal to or lower than a liquefaction temperature of the sample gas.

14. The thermal conductivity detector according to claim 13, wherein the thermal insulator is attached to the casing such that a temperature of the sample gas that passes through the second portion does not decrease to a temperature equal to or lower than a liquefaction temperature of the sample gas.

15. The thermal conductivity detector according to claim 13, wherein the temperature retainer includes glass wool.

16. The thermal conductivity detector according to claim 13, wherein the thermal insulator insulates the sample gas from outside of the casing.

17. The thermal conductivity detector according to claim 13, wherein the temperature retainer includes a temperature adjustor that adjusts the temperature of the sample gas.

18. A gas chromatograph, comprising:
a sample vaporizer that produces a sample gas by vaporizing a sample;
a column that separates the sample gas produced by the sample vaporizer into components; and
the thermal conductivity detector of claim 13,
wherein the thermal conductivity detector detects thermal conductivity of each component of the sample gas separated by the column.

19. A thermal conductivity detector for a gas chromatograph, comprising:
a flow path that has a first portion, and a second portion located at a position farther downstream than the first portion, and leads a sample gas to an exhaust port of the second portion through the first and second portions;
a casing that stores the first portion of the flow path; and
a heat generator that is stored in the first portion of the flow path to detect thermal conductivity of the sample gas,
wherein at least one portion including a downstream end of the second portion of the flow path is provided to be attachable to and detachable from another portion of the flow path.

20. A gas chromatograph, comprising:
a sample vaporizer that produces a sample gas by vaporizing a sample;
a column that separates the sample gas produced by the sample vaporizer into components; and
the thermal conductivity detector of claim 19,
wherein the thermal conductivity detector detects thermal conductivity of each component of the sample gas separated by the column.

* * * * *